United States Patent [19]

Lorance

[11] Patent Number: 5,492,506
[45] Date of Patent: Feb. 20, 1996

[54] CONTINUOUSLY VARIABLE PULLEY

[76] Inventor: R. Dennis Lorance, Rte. 1, Box 38, Burr, Nebr. 68324

[21] Appl. No.: 324,764

[22] Filed: Oct. 14, 1994

[51] Int. Cl.$^6$ ............................................. F16H 55/52
[52] U.S. Cl. .................................................... 474/49
[58] Field of Search ............................... 474/49–57

[56] References Cited

U.S. PATENT DOCUMENTS

| | | | |
|---|---|---|---|
| 3,604,281 | 9/1971 | Shambaugh | 74/230.5 |
| 3,800,613 | 4/1974 | Clark | 74/244 |
| 3,956,944 | 5/1976 | Tompkins | 74/244 |
| 4,024,772 | 5/1977 | Kumm | 74/230.6 |
| 4,453,923 | 6/1984 | Cole, Jr. | 474/47 |
| 4,832,660 | 5/1989 | Leonard | 474/56 X |
| 4,850,939 | 7/1989 | Chilcote et al. | 474/49 |
| 4,874,351 | 10/1989 | Jackson | 474/49 |
| 4,875,894 | 10/1989 | Clark | 474/49 |
| 4,915,673 | 4/1990 | Krude | 474/49 |
| 4,973,289 | 11/1990 | Leonard | 474/49 |

*Primary Examiner*—Michael Powell Buiz
*Attorney, Agent, or Firm*—Zarley, McKee, Thomte, Voorhees & Sease; Mark D. Frederiksen

[57] ABSTRACT

A continuously variable diameter pulley includes a cylindrical hub mounted on a drive shaft for rotation therewith. A plurality of vanes have stem portions slidably journaled through radial apertures in the hub for slidable movement radially inwardly and outwardly in the hub. The vanes include head portions which form an outer circumferential drive surface around the hub. A first apparatus for sliding the vanes radially outwardly includes a cone slidably mounted on the drive shaft for rotation therewith and for slidable movement longitudinally along the drive shaft. The cone is slidable into a central cavity formed in the hub, with the conic surface of the cone contacting beveled inward ends of the vanes, to force the vanes outwardly as the cone is pushed into the hub cavity. A second apparatus for extending the vanes radially outwardly from the hub includes a disk-shaped plate with a plurality of radially extending apertures and a plurality of hydraulic fluid wells. The inward ends of the vane stems slide radially inwardly into the plate apertures, and a bearing plate with a plurality of pistons is operable to force the piston into the wells and thereby force the hydraulic fluid to push the vanes radially outwardly.

8 Claims, 6 Drawing Sheets

5,492,506

CONTINUOUSLY VARIABLE PULLEY

TECHNICAL FIELD

The present invention relates generally to continuously variable belt drive transmissions, and more particularly to a continuously variable transmission of the type wherein the effective diameter of the pulley which the belt passes over is continuously and infinitely adjustable between maximum and minimum positions.

BACKGROUND OF THE INVENTION

The primary modes of ground transportation include the automobile, motorcycle and bicycle. Each of these forms of transportation utilize a drive motor and a transmission to select one of a finite number of gears. This use of gears permits the vehicle to produce large amounts of pulling power when in a low gear, or travel at high speeds, when in a higher gear.

Although the gear system of transmissions are prevalent in ground transportation, there are a number of inadequacies associated with such systems. The main problem, is the finite number of gear ratios which are available for the vehicle. In many cases, it is not possible to adjust the vehicle to the specific gear ratio desired for a particular task. While bicycles are available in "10-speed" and "15-speed" models, motorcycles and automobiles do not typically have such capabilities. In addition, even with bicycles that have a large number of gears available, it is typically time-consuming to find the appropriate combination of rearward gears and forward gears to provide the desired gear ratio.

SUMMARY OF THE INVENTION

It is therefore a general object of the present invention to provide an improved continuously variable pulley for transmissions.

Another object of the present invention is to provide a continuously variable pulley which permits infinite adjustable of pulley diameters between maximum and minimum diameters.

A further object is to provide a continuously variable pulley which is simple to operate and provides precise control over the variable diameter of the pulley.

These and other objects will be apparent to those skilled in the art.

The continuously variable diameter pulley of the present invention includes a cylindrical hub mounted on a drive shaft for rotation therewith. A plurality of vanes have stem portions slidably journaled through radial apertures in the hub for slidable movement radially inwardly and outwardly in the hub. The vanes include head portions which form an outer circumferential drive surface around the hub. A first apparatus for sliding the vanes radially outwardly includes a cone slidably mounted on the drive shaft for rotation therewith and for slidable movement longitudinally along the drive shaft. The cone is slidable into a central cavity formed in the hub, with the conic surface of the cone contacting beveled inward ends of the vanes, to force the vanes outwardly as the cone is pushed into the hub cavity. A second apparatus for extending the vanes radially outwardly from the hub includes a disk-shaped plate with a plurality of radially extending apertures and a plurality of hydraulic fluid wells. The inward ends of the vane stems slide radially inwardly into the plate apertures, and a bearing plate with a plurality of pistons is operable to force the piston into the wells and thereby force the hydraulic fluid to push the vanes radially outwardly.

DESCRIPTION OF THE PREFERRED EMBODIMENT

Figure 1:
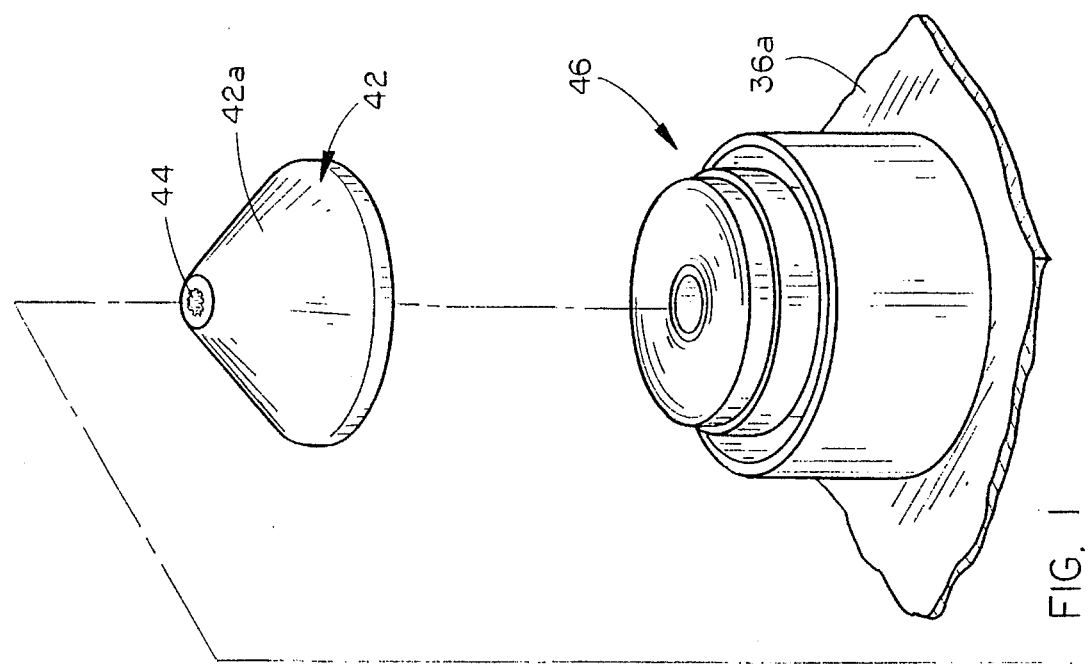
FIG. 1 is an exploded perspective view of the continuously variable pulley and adjustment mechanism of the present invention.
Figure 1:
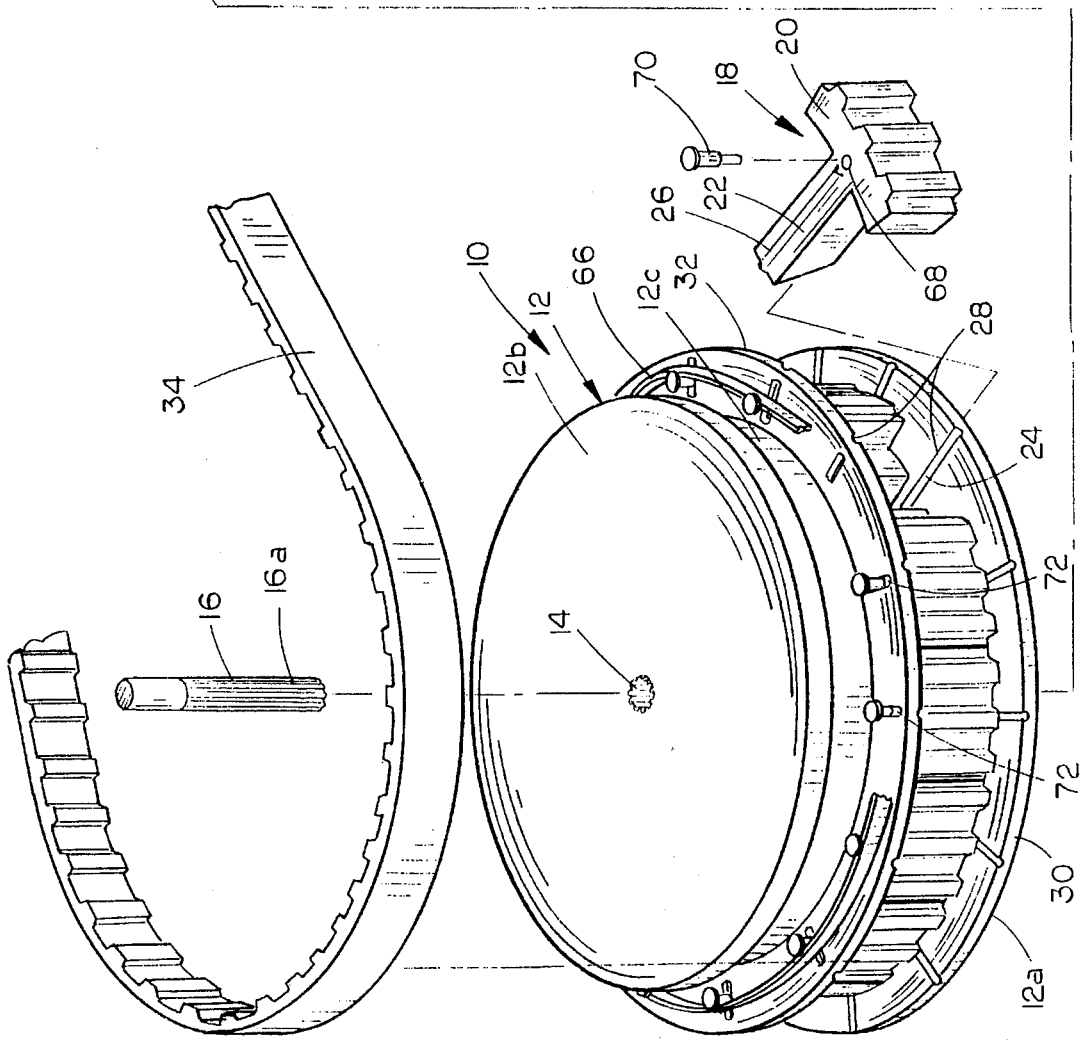

Referring now to the drawings, in which similar or corresponding parts are identified with the same reference numeral, and more particularly to FIG. 1, the continuously variable pulley of the present invention is designated generally at 10 and includes a generally cylindrical hub 12 having a forward face 12a, a rearward face 12b and a centrally and axially disposed aperture 14 therethrough. As shown in FIG. 1, aperture 14 has longitudinal grooves which will engage a splined drive shaft 16 extending from a power source (not shown).

A plurality of vanes 18 include a head portion 20 and a stem 22 projecting generally perpendicularly from the head portion to form a general "T" shape. Each vane 18 is slidably mounted within an aperture 24 extending radially inwardly from the circumferential outer surface 12c of hub 12. The stem 22 of each vane 18 is journaled in an aperture 24 for radial slidable movement. Each stem 22 includes a pair of longitudinally extending ridges 26 on opposing sides of stem 22, which cooperate with radially extending grooves 28 in opposing interior walls of aperture 24.

Hub 12 includes a pair of spaced-apart forward and rearward radially projecting annular flanges 30 and 32. Flanges 30 and 32 are located on opposing sides of each vane aperture 24 and have grooves 28 formed therein continuing the grooves 28 in aperture walls 24. Flanges 30 and 32 serve to retain a drive belt 34 on vane heads 20 around the perimeter formed by vane heads 20.

Figure 2:
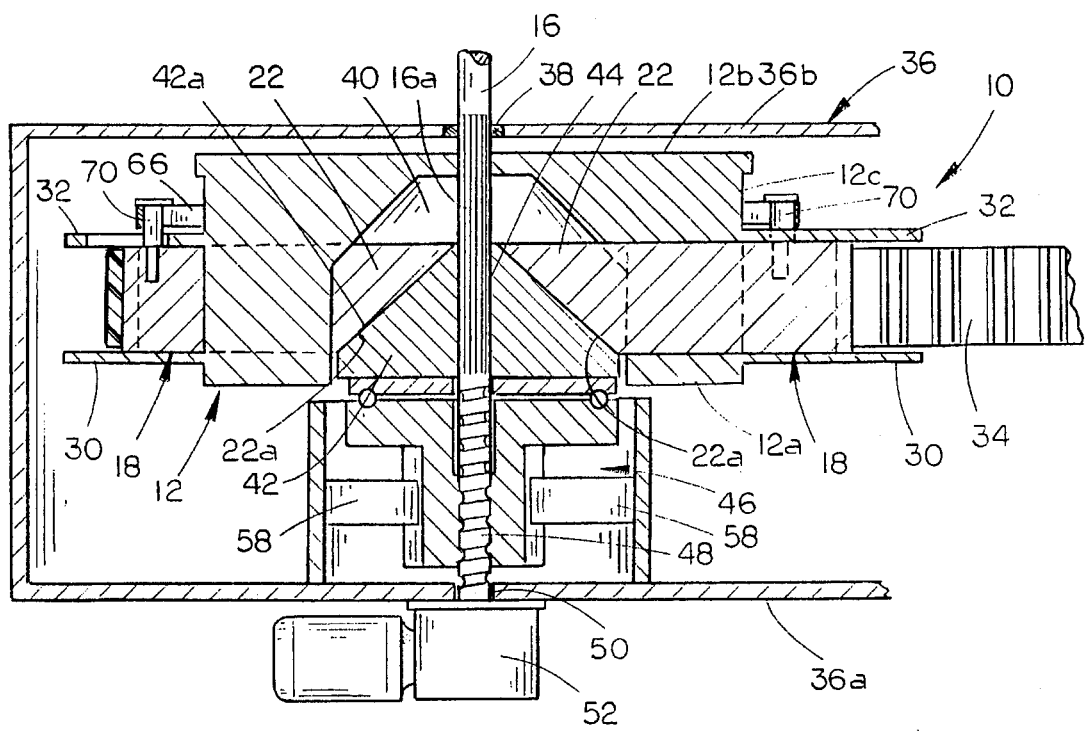
FIG. 2 is a sectional view taken at lines 2—2 in FIG. 4, with the adjustment mechanism shown as well.
Figure 3:
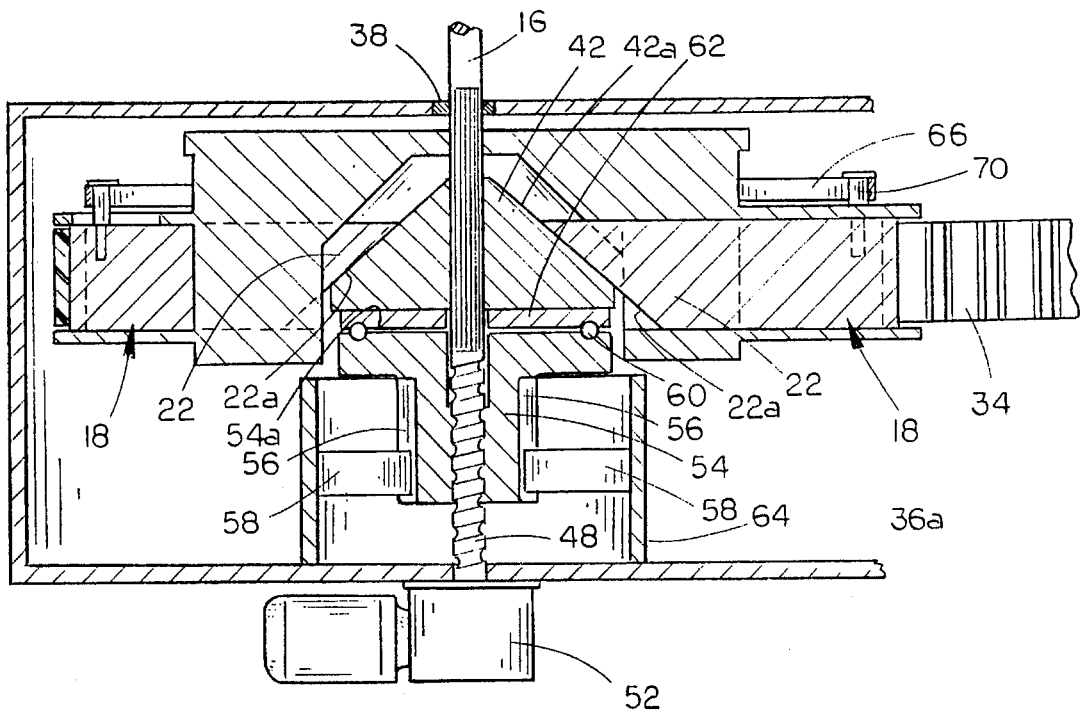
FIG. 3 is a sectional view taken at lines 3—3 in FIG. 5, with the adjustment mechanism shown as well.
Figure 4:
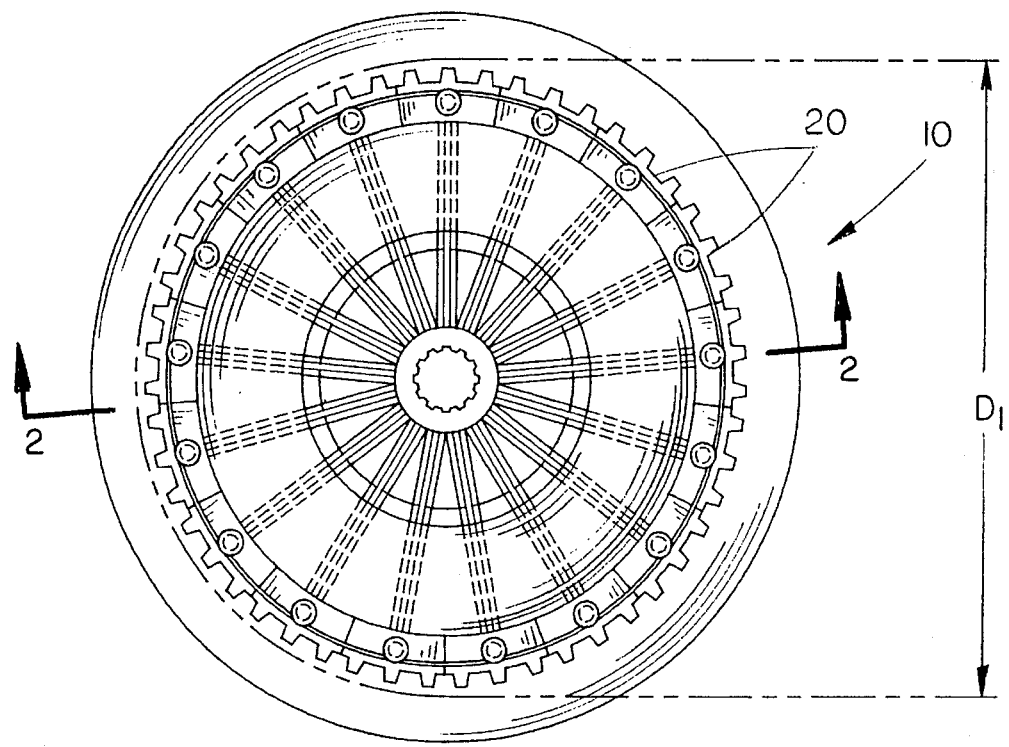
FIG. 4 is a front elevational view of the continuously variable pulley of the present invention, with the adjuster mechanism removed, and the pulley shown in a retracted position.

Referring now to FIGS. 2 and 3, pulley 10 is shown mounted between forward and rearward walls 36a and 36b of a housing 36. Drive shaft 16 is rotatably mounted through a bearing 38 in rearward housing wall 36b and extends within the interior of housing 36. Hub 12 is press fit on the splined portion of drive shaft 16 to rotate therewith and prevent longitudinal slidable movement of the hub along drive shaft 16.

Hub 12 has an interior cavity 40 formed therein extending from forward face 12*a* rearwardly and centrally therein. The stems 22 of vanes 18 extend into cavity 40, and have a beveled inward end 22*a*, as shown in the drawings. These beveled inward stem ends 22*a* of vanes 18 are arranged to correspond with the conic surface 42*a* of an adjuster cone 42 slidably mounted along drive shaft 16. Referring again to FIG. 1, it can be seen that adjustment cone 42 includes an aperture 44 extending through the longitudinal axis thereof, which includes longitudinal grooves adapted to slidably receive the splined portion 16*a* of drive shaft 16. Thus, as shown in FIGS. 2 and 3, cone 42 is freely slidable longitudinally along drive shaft 16, but rotates therewith because of the engagement of the splined portion 16*a* of drive shaft 16 and aperture 44.

Referring to FIG. 3, movement of adjuster cone 42 rearwardly along drive shaft 16 will cause the vane stems 22 to move radially outwardly, as beveled stem ends 22*a* slide along conic surface 42*a* of cone 42.

An adjustment mechanism 46 is mounted to the interior surface of forward wall 36*a* of housing 36 and serves to slide cone 42 longitudinally along drive shaft 16, to provide the desired overall diameter of pulley 10. Adjustment mechanism 46 preferably includes a threaded drive screw 48 extending through an aperture 50 on housing forward wall 36*a* and connected to a servo drive 52. Servo drive 52 selectively rotates drive screw 48 in the desired direction, to thereby move a cylindrical thruster 54 longitudinally along screw 48. Thruster 54 includes a pair of longitudinally extending slots 56 along diametric sides thereof which receive projecting keys 58 to prevent rotation of thruster 54 with the rotation of drive screw 48.

An annular bearing race 60 is mounted on the rearward bearing face 54*a* of thruster 54 and contacts a disc-shaped bearing plate 62 mounted on the forward end of cone 52. Thus, bearing plate 62 rotates with cone 42 on drive shaft 16, while thruster 54 remains stationary, yet longitudinally slidable along drive screw 48. A tubular member 64 supports keys 58 on the inward surface of forward housing side 36*a*.

In order to maintain constant contact between stem inward ends 22*a* and conic surface 42*a*, a radially directed biasing force is applied to each vane 18 with an elastic band 66, as shown in FIGS. 1–3. As shown in FIG. 1, each vane 18 has an aperture 68 formed in one side wall thereof which will receive a pin 70 therein. Rearward flange 32 has a plurality of slots 72 extending radially therethrough which will receive each vane pin 70 therein to permit longitudinal slidable movement of the vane and pin within the slot. Elastic band 66 extends around the projecting ends of pins 70 to apply a uniform biasing force in a direction radially inwardly towards the center of hub 12. A head 70*a* on each pin 70 retains band 66 on the pins.

Figure 5:
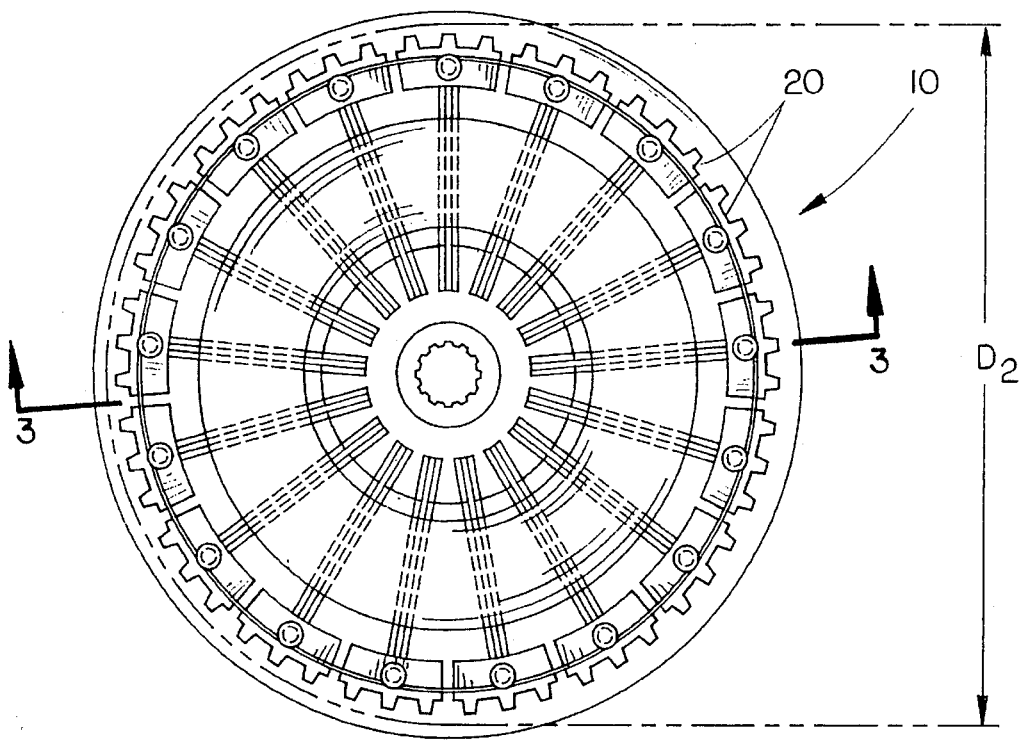
FIG. 5 is a view similar to FIG. 4, with the pulley shown in a partially expanded position.

Referring now to FIGS. 2–5, FIGS. 2 and 4 show pulley 10 in a retracted position, wherein the overall diameter $D_1$ of pulley 10 is at its minimum, with vane heads 20 in abutting contact with one another to form a continuous circumferential surface for the drive belt. Upon activation of servo 52, thruster 54 is moved longitudinally along drive screw 48, which in turn slides adjuster cone 42 rearwardly along drive shaft 16 to thereby cause vanes 18 to move radially outwardly, as shown in FIGS. 3 and 5. Thus, the overall diameter $D_2$ of pulley 10 is increased, thereby causing drive belt 34 to increase in velocity while the rotational speed of drive shaft 16 remains constant. Thus, it can be seen that the ratio of drive belt velocity relative to rotational velocity of drive shaft 16 may be infinitely adjusted between the maximum and minimum diameters of pulley 10.

Figure 6:
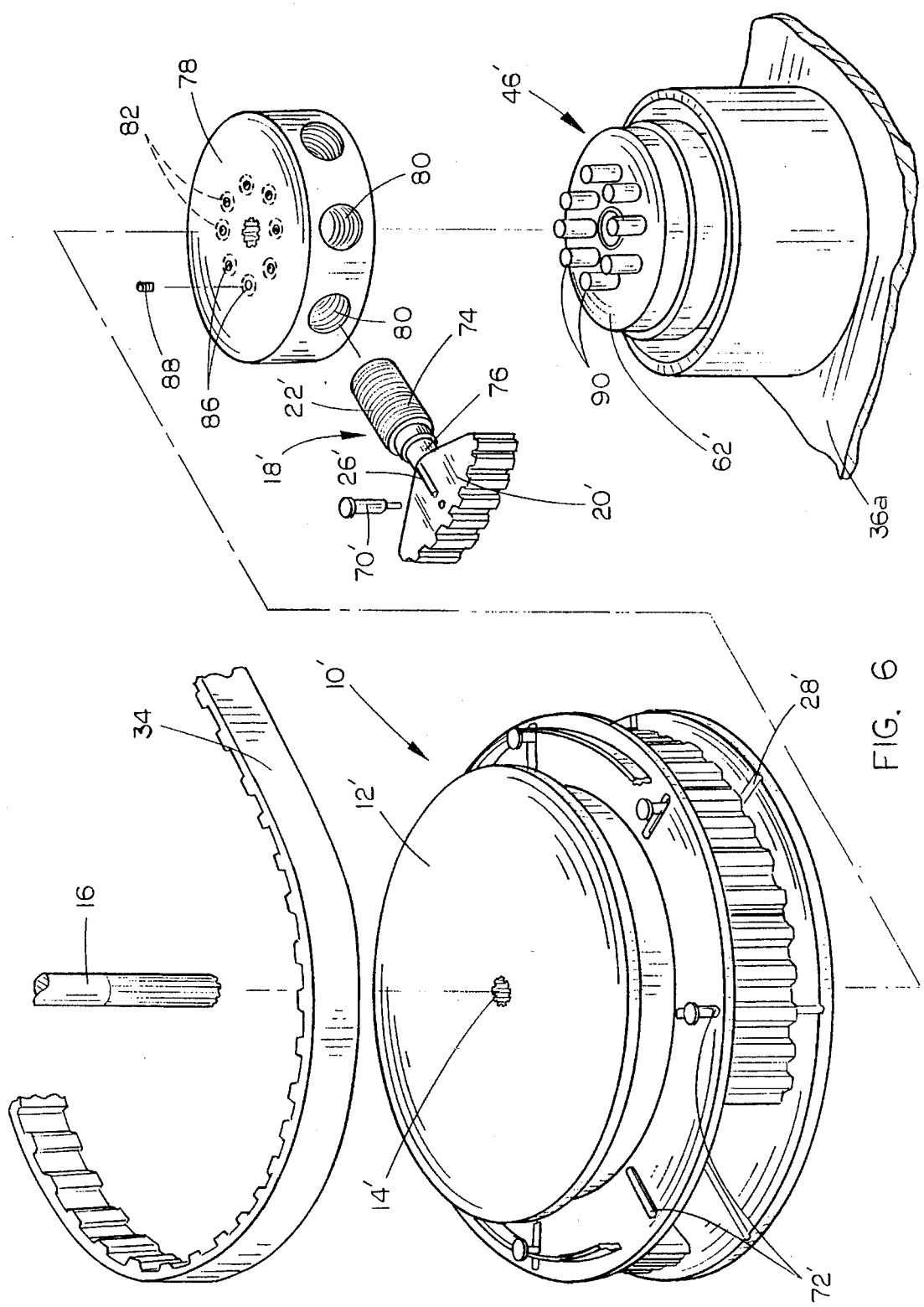
FIG. 6 is an exploded perspective view of a second embodiment of the continuously variable pulley and adjustment mechanism of the present invention.

Referring now to FIG. 6, a second embodiment of the pulley of the present invention is designated generally at 10' and includes cylindrical hub 12' with a centrally and axially disposed aperture 14' therethrough. Aperture 14' has longitudinal grooves which will engage a splined drive shaft 16 extending from the power source.

Figure 7:
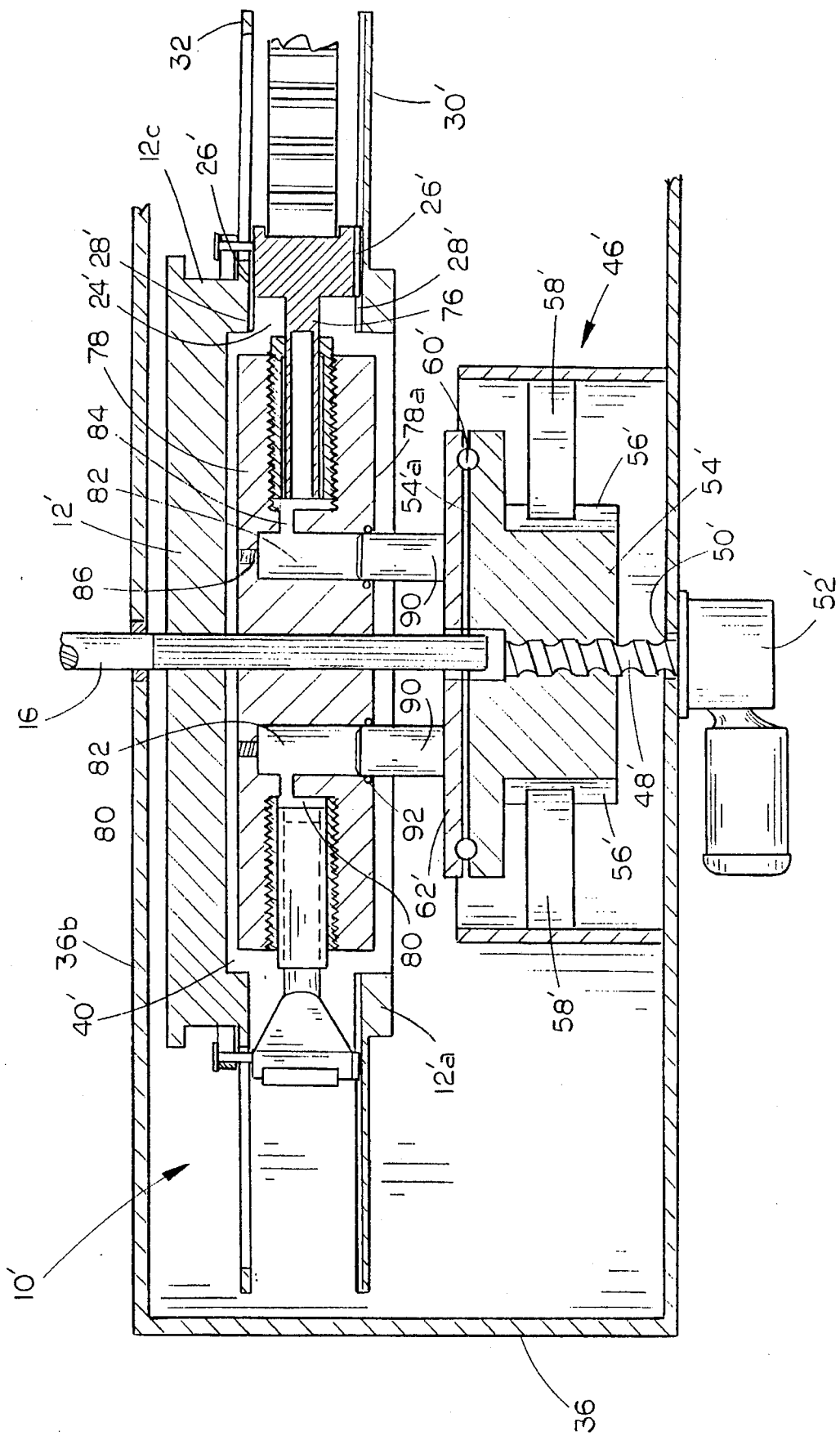
FIG. 7 is a sectional view taken at lines 7—7 in FIG. 8, including the adjustment mechanism.

Vanes 18' include a head portion 20' and a stem 22' projecting generally perpendicularly from the head portion to form a general "T+ shape. Vane 18' differs from the vanes of the first embodiment in the use of a telescoping stem portion 22' which is hydraulically actuated, as described in more detail hereinbelow. Each vane 18' is slidably mounted within an aperture 24' extending radially inwardly from the circumferential outer surface 12*c* of hub 12, as shown in FIG. 7. Each vane stem 22' includes an outer cylindrical housing 74 with at least one telescoping arm 76 slidably journaled therein, with head portion 20' mounted to a forward end of telescoping arm 76. The head portion 20' of each vane includes a pair of longitudinally extending ridges 26' on opposing sides, which cooperate with radially extending grooves 28' in opposing interior walls of aperture 24'.

Hub 12' includes a pair of spaced apart forward and rearward radially projecting annual flanges 30' and 32', which serve to retain the drive belt 34 on vane heads 20' around the perimeter formed by vane heads 20'.

Pulley 10' is mounted in a similar fashion as pulley 10, between the forward and rearward walls of a housing 36, as shown in FIG. 7. Drive shaft 16 is rotatably mounted through housing rearward wall 36*b* and extends within the interior of housing 36. Hub 12' is press fit on the splined portion of drive shaft 16 to rotate therewith and prevent longitudinal slidable movement of the hub along shaft 16.

Hub 12' has an interior cavity 40' formed therein extending from forward face 12'*a* rearwardly and centrally therein. A cylindrical plate 78 is journaled on drive shaft 16 for rotation therewith, and has a diameter less than the diameter of hub cavity 40' to fit therein, as shown in FIG. 7. Plate 78 includes a plurality of radial apertures 80 which are interiorly threaded to receive the exterior thread on each vane housing 74. In this way, each vane 18' may be removably mounted within plate 78.

The forward face 78*a* of plate 78 includes a plurality of wells 82 spaced apart and in a circular orientation equal distant from drive shaft 16. Each well 82 is radially aligned with a radial aperture 80 in plate 78, and includes a fluid passageway 84 communicating therebetween. In this way, hydraulic fluid within well 82 may be forced through passageway 84 and into radial aperture 80 to hydraulically extend telescoping arm 76 of vane 18'. Each well 82 is also provided with a threaded opening 86 and a corresponding threaded plug 88 extending through the rearward face of hub 12' to permit the bleeding of air out of the system when filled with hydraulic fluid.

A second embodiment of an adjustment mechanism 46' is mounted to the interior surface of forward wall 36*a* of housing 36 and serves to force hydraulic fluid through passageway 84 to extend vanes 18'. Adjustment mechanism 46' includes a threaded drive screw 48' extending through an aperture 50' on housing forward wall 36*a* and connected to a servo drive 52'. Servo drive 52' selectively rotates drive screw 48' in the desired direction, to thereby move a cylindrical thruster 54' longitudinally along screw 48'. Thruster 54' includes a pair of longitudinally extending slots 56' along diametric sides thereof which receive projecting keys 58' to prevent rotation of thruster 54' with the rotation of drive screw 48'.

An annular bearing race 60' is mounted on the rearward bearing face 54'a of thruster 54' and contacts a disc-shaped bearing plate 62', as shown in FIG. 7. Bearing plate 62' includes a plurality of projecting pistons 90 which correspond with wells 82 of plate 78, as shown in FIG. 6. Pistons 90 are slidably journaled within wells 82, as shown in FIG. 7, and are forced inwardly or outwardly by adjustment mechanism 46', to cause hydraulic fluid to force vanes 18' outwardly. A seal ring 92 is provided in each well 82 to maintain hydraulic fluid within the well.

As in the first embodiment of the invention, a radially direct biasing force is applied to each vane 18' with an elastic band 66, as shown in FIGS. 6–9. A pin 70' mounted in the head portion 20' of each vane 18' is slidable within a slot 72' in the same fashion as the first embodiment. Elastic band 66 extends around the projecting ends of pin 70' to apply uniform biasing force in a direction radially inwardly towards the center of hub 12'.

Figure 8:
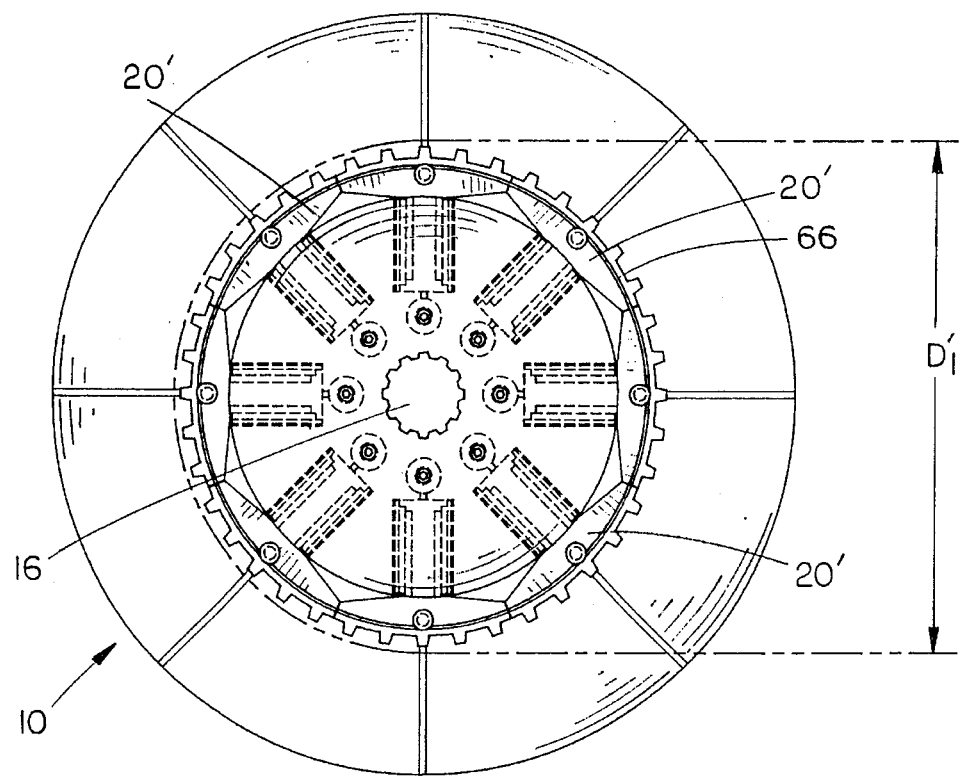
FIG. 8 is a front elevational view of the pulley of the second embodiment, with the adjuster mechanism removed, and the pulley shown in a retracted position.
Figure 9:
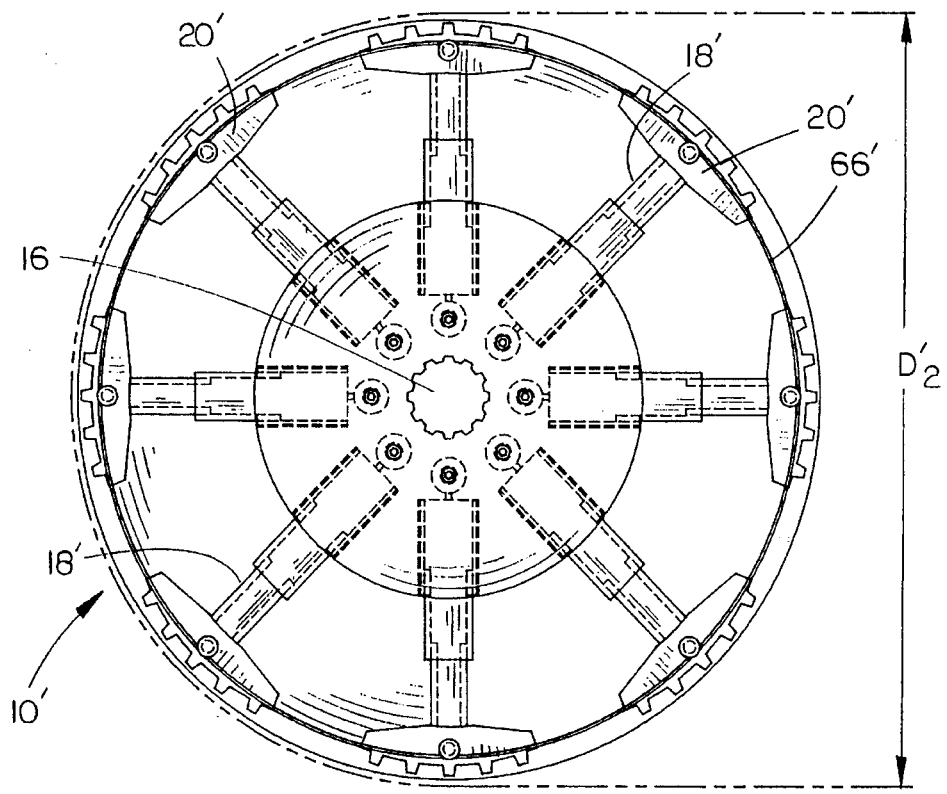
FIG. 9 is a view similar to FIG. 8, with the pulley shown in an expanded position.

FIG. 8 shows pulley 10' in a retracted position, wherein the overall diameter $D'_1$ of pulley 10' is at its minimum, with vane heads 20' in abutting contact with one another to form a continuous circumferential surface for the drive belts. Upon the activation of adjustment mechanism 46', vanes 18' are moved radially outwardly, as shown in FIG. 9. Thus, the overall diameter $D'_2$ of pulley 10' is increased, thereby causing drive belt 34 to increase in velocity while the rotational speed of drive shaft 16 remains constant.

Whereas the invention has been shown and described in connection with the preferred embodiment thereof, many modifications, substitutions and additions may be made which are within the intended broad scope of the appended claims. For example, while a servo drive is shown in the drawings for advancing cone 42, levers or other apparatus may be utilized to accomplish the same function. Similarly, the radial movement of vanes 18 may be achieved with hydraulic pistons or the like, rather than the adjuster cone 42, shown in the drawings.

It is therefore believed that the continuously variable pulley of the present invention accomplishes at least all of the above-stated objects.

I claim:

1. A continuously variable diameter pulley, comprising:
    a generally cylindrical hub having a forward face, a rearward face, a circumferential surface and a longitudinal axis extending from the rearward to the forward face;
    said hub coaxially mounted on a drive shaft for rotation therewith;
    a plurality of vanes, each vane having a head portion mounted on a stem portion, with said stems slidably journaled through apertures extending radially inwardly into said hub circumferential surface, for slidable movement radially inwardly and outwardly in said apertures and rotational movement with said hub;
    said vane head portions forming an outer circumferential drive surface around said hub; and
    means for simultaneously sliding all of said vanes inwardly and outwardly in said apertures, to selectively vary the overall diameter of the circumferential drive surface of the pulley.

2. The pulley of claim 1, further comprising means for uniformly biasing said vanes radially inwardly.

3. The pulley of claim 1, further comprising a drive belt engaging at least a portion of the drive surface of said vane heads, to move said drive belt in association with rotation of the drive shaft.

4. The pulley of claim 1, wherein said means for sliding said vanes outwardly includes:
    a central cavity formed in said hub, extending rearwardly from the forward face thereof;
    said vane stems including an inward end slidably projecting into said cavity; and
    means contacting the vane stem inward ends for forcing said stems radially outward through said vane apertures.

5. The pulley of claim 4, wherein said means for forcing the vane stems radially outwardly includes:
    said drive shaft extending through said hub cavity;
    a cone slidably mounted on said drive shaft for rotational movement therewith and slidable movement longitudinally along said drive shaft;
    each said vane stem inward end having a beveled surface in contact with a conic surface of said cone such that longitudinal movement of the cone rearwardly along the drive shaft causes radial outward movement of said stems; and
    thruster apparatus for selectively sliding said cone rearwardly along said drive shaft.

6. The pulley of claim 5, wherein said thruster apparatus includes:
    a thruster bearing operably mounted on a drive screw coaxial with said drive shaft, and operable for selective longitudinal movement forwardly and rearwardly along said drive screw coaxial with the drive shaft;
    said thrust bearing having a bearing surface in contact with said cone to move said cone longitudinally along said drive shaft; and
    means for moving said thrust bearing forwardly and rearwardly along said drive screw.

7. The pulley of claim 3, wherein said hub includes a pair of spaced-apart forward and rearward annular flanges projecting radially from the circumferential surface of said hub, said vanes slidably journaled between said forward and rearward flanges.

8. The pulley of claim 4, wherein said means for forcing the vane stems radially outwardly includes:
    a disk-shaped plate connected to said drive shaft within said hub cavity, having a plurality of apertures extending radially inwardly into a circumferential surface of the plate, aligned with said hub radial apertures;
    each said vane stem slidably journaled within said plate apertures for radial movement therein;
    a plurality of wells extending from a forward face of the disk-shaped plate rearwardly into the plate, each well being fluidly connected with each of said plurality of plate apertures;
    hydraulic fluid in said wells;
    a plurality of pistons mounted on a bearing plate and aligned for simultaneous movement into and out of the wells, to force the hydraulic fluid the plate radial apertures to push the vane stems radially outwardly; and
    said bearing plate including means for selectively moving the bearing plate towards and away from the disk-shaped plate, for selective extension of the vanes.

\* \* \* \* \*